United States Patent
Matsuda (10) Patent No.: US 7,761,509 B2
(45) Date of Patent: Jul. 20, 2010

(54) PROGRAM PRODUCT AND CONNECTED DEVICE FOR LINKING OPERATIONS BETWEEN MULTIPLE CONNECTED DEVICES

(75) Inventor: Masahiro Matsuda, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 779 days.

(21) Appl. No.: 11/548,828

(22) Filed: Oct. 12, 2006

(65) Prior Publication Data

US 2007/0124424 A1    May 31, 2007

(30) Foreign Application Priority Data

Oct. 13, 2005    (JP)    ............... 2005-298729

(51) Int. Cl.
*G06F 15/16* (2006.01)
(52) U.S. Cl. .................. 709/204; 709/200; 709/223; 379/102.03
(58) Field of Classification Search .................. 709/204
See application file for complete search history.

(56) References Cited

U.S. PATENT DOCUMENTS

| | | | | |
|---|---|---|---|---|
| 4,392,022 | A * | 7/1983 | Carlson ....................... | 348/552 |
| 5,905,843 | A * | 5/1999 | Kim et al. ..................... | 386/83 |
| 6,061,435 | A * | 5/2000 | Grundvig et al. ........ | 379/102.03 |
| 6,678,362 | B2 * | 1/2004 | Hong et al. ............. | 379/102.03 |
| 6,690,778 | B2 * | 2/2004 | Kahn ..................... | 379/110.01 |
| 6,907,021 | B1 * | 6/2005 | Nelson ........................ | 370/338 |
| 7,039,698 | B2 * | 5/2006 | Slemmer et al. ............ | 709/223 |
| 7,161,483 | B2 * | 1/2007 | Chung ........................ | 340/531 |
| 7,493,079 | B2 * | 2/2009 | Koizume et al. ........... | 455/3.06 |
| 2001/0038690 | A1 * | 11/2001 | Palmer et al. ........... | 379/218.01 |
| 2005/0122435 | A1 * | 6/2005 | Yunoki ........................ | 348/725 |
| 2005/0159823 | A1 * | 7/2005 | Hayes et al. ................... | 700/19 |
| 2005/0246408 | A1 * | 11/2005 | Chung ........................ | 709/200 |
| 2006/0129547 | A1 * | 6/2006 | Yamamoto et al. ............. | 707/5 |
| 2006/0258396 | A1 * | 11/2006 | Matsuoka ................ | 455/556.1 |
| 2007/0183744 | A1 * | 8/2007 | Koizumi et al. ............... | 386/83 |
| 2008/0252427 | A1 * | 10/2008 | Bergevoet ................ | 340/10.41 |

FOREIGN PATENT DOCUMENTS

| | | |
|---|---|---|
| JP | 2002-186067 A | 6/2002 |
| JP | 2004-258809 A | 9/2004 |
| JP | 2004-304789 A | 10/2004 |

* cited by examiner

*Primary Examiner*—Firmin Backer
*Assistant Examiner*—Jonathan Bui
(74) *Attorney, Agent, or Firm*—Crowell & Moring LLP (57) ABSTRACT

A program product stored on a recordable medium for linking operations between multiple connected devices connected to each other via a network is provided. The program product includes: program code for setting a state of a linked device for execution of linked operations between the connected devices, a state change (occurrence of an event) at an external device that is a condition for execution of the linked operations, and an operation to be executed by the linked device upon the occurrence of the event; program code for storing the settings; program code for sending a request for registration of necessity to notify the linked device of occurrence of an event; program code for determining whether an operation to be executed by the linked device that corresponds to a current state of the linked device and to the notified event is stored or not; and program code for executing the operation.

1 Claim, 9 Drawing Sheets

```
                            70
┌─────────────────────────────────────────────┐
│            EXECUTED OPERATION LIST           │
│                                              │
│  * SELECT OPERATION OF DTV TO BE EXECUTED UPON│
│    OCCURRENCE OF EVENT AT EXTERNAL DEVICE.   │
│                                              │
│   ┌──────────────────┐   ┌──────────────────┐│
│   │ TURN DOWN VOLUME │   │      MUTE        ││
│   └──────────────────┘   └──────────────────┘│ ⎫
│                                              │ ⎬ 71
│   ┌──────────────────┐   ┌──────────────────┐│ ⎭
│   │  START RECORDING │   │  RESTORE VOLUME  ││
│   └──────────────────┘   └──────────────────┘│
│                                              │
│   ┌──────────────────┐   ┌──────────────────┐│
│   │  DISPLAY CHASING │   │  DISPLAY VISITOR ││
│   │ PLAYBACK SELECTION│  │ INFORMATION SCREEN││
│   │      SCREEN      │   │                  ││
│   └──────────────────┘   └──────────────────┘│
└─────────────────────────────────────────────┘
```

CHASING PLAYBACK SELECTION SCREEN

\* DO YOU WANT CHASING PLAYBACK?

YES   NO

FIG. 11

VISITOR INFORMATION SCREEN (1)

\* VISITOR HAS COME.
  PLAYBACK OF PROGRAM IS PAUSED.

CONFIRM — 81

FIG. 12

PROGRAM PRODUCT AND CONNECTED DEVICE FOR LINKING OPERATIONS BETWEEN MULTIPLE CONNECTED DEVICES

BACKGROUND OF THE INVENTION

1. Field of the Invention

The present invention relates to a program product for linking operations between multiple devices connected to each other via a network, and to a connected device that serves to link operations between the multiple connected devices.

2. Description of the Related Art

There are proposed methods for linking operations between multiple devices connected to each other via a network. For example, Japanese laid-open patent publication 2002-186067 discloses an electric appliance control device that is designed to control all electric appliances connected thereto such as a television receiver, an air conditioner, and a telephone by receiving a control command from one of the electric appliances via a communication line, storing the received control command in a code memory provided in a control signal sending/receiving unit, and sending the control command received from the electric appliance, which is stored in the code memory, from an infrared transmitter/receiver in the control signal sending/receiving unit. This device enables linked operations such as turning down the volume on the television receiver in response to a telephone call.

However, the above described electric appliance control device has the following problem. When an event (e.g. an incoming call) occurs at an external device (e.g., the telephone), the control device always performs a process for a device (e.g., the television receiver) that is to operate in conjunction with the external device (such a device is hereinafter referred to as "linked device") without respect to the state of the linked device. For example, even when there is no audio signal input to the television receiver at the time of the incoming call, the control device may perform the process for turning down the volume on the television receiver. As another example, assume that the control device has been programmed to cause a hard disk drive (HDD) recorder to automatically start recording when a call at the telephone lasts more than a given time. In this case, when the given time has elapsed from the start of a call at the telephone, the control device may perform the process for causing the HDD recorder to automatically start recording even when the HDD recorder is already during recording. Accordingly, the electric appliance control device disclosed in Japanese laid-open patent publication 2002-186067 cannot always allow linked operations to be performed as a user truly desires. Further, the electric appliance control device disclosed in Japanese laid-open patent publication 2002-186067 has a problem that it requires the above described control signal sending/receiving unit as well as a dedicated device (such as a personal computer) as the electric appliance control device.

Japanese laid-open patent publication 2004-304789 discloses an electric appliance control device and an electric appliance control method for, when receiving from a user the designation of an appliance in a state different from a state desired by the user, identifying a linked operation to be modified based on a linked operation table, appliance history information, and so on and then modifying the linked operation table so that the appliance can be in the desired state at a reference time.

Further, Japanese laid-open patent publication 2004-258809 discloses a middleware for information appliance networks that, upon receipt of a service request from a user, activates a service component corresponding to the requested service in accordance with service component information contained in a look-up table.

However, the inventions disclosed in Japanese laid-open patent publication Nos. 2004-304789 and 2004-258809 always perform an operation for a linked device without respect to the state of the linked device when an event occurs at an external device. Accordingly, neither of the inventions allows linked operations to be always performed as a user truly desires.

SUMMARY OF THE INVENTION

An object of the present invention is to provide a program and a connected device that, upon the occurrence of an event at an external device, can perform an operation for a linked device after taking into account the state of the linked device so that linked operations can be performed as a user truly desires.

According to a first aspect of the present invention, this object is achieved by a program product stored on a recordable medium for linking operations between multiple connected devices connected to each other via a network.

The program product is installed in a connected device (hereinafter referred to as "linked device") of the multiple connected devices.

The program product comprises: program code for setting a state of the linked device for execution of linked operations between the connected devices, a state change (hereinafter referred to as "occurrence of an event") at an external device in the network that is a condition for execution of the linked operations, and an operation of the linked device to be executed upon the occurrence of the event at the external device; program code for storing settings set by the program code for setting; program code for sending, to the external device, a request for registration of necessity to notify the linked device of occurrence of an event when the event occurs at the external device; program code for, upon receipt of a notification of occurrence of an event from the external device, determining whether an operation of the linked device that corresponds to a current state of the linked device and to the notified event is stored or not; and program code for, when it is found as a result of the determination that the corresponding operation of the linked device is stored, executing the stored operation.

With the above configuration, when a notification of occurrence of an event is received from an external device, an operation of the linked device can be executed so as to be appropriate to the current state of the linked device as well as to the notified event. In this manner, upon the occurrence of an event at an external device, an operation of the linked device can be executed after the current state of the linked device is taken into account. This can increase the probability that linked operations will be performed as a user truly desires.

Preferably, the program code for setting is program code for further setting the external device at which the event occurs.

Preferably, the network is an Internet Protocol (IP) network.

Preferably, the multiple connected devices are in conformity with Universal Plug and Play (UPnP) standard.

According to a second aspect of the present invention, the object is achieved by a connected device of multiple connected devices connected to each other via a network.

The connected device comprises: linked operation setting means for setting a state of the connected device itself for execution of linked operations between the connected devices, a state change (hereinafter referred to as "occurrence of an event") at an external device in the network that is a condition for execution of the linked operations, and an operation of the connected device itself to be executed upon the occurrence of the event at the external device; linked operation setting storage means for storing settings set by the linked operation setting means; registration request sending means for sending, to the external device, a request for registration of necessity to notify the connected device itself of occurrence of an event when the event occurs at the external device; determining means for, upon receipt of a notification of occurrence of an event from the external device, determining whether or not an operation of the connected device itself that corresponds to a current state of the connected device itself and to the notified event is stored in the linked operation setting storage means; and executing means for, when it is found as a result of the determination by the determining means that the corresponding operation of the connected device itself is stored, executing the stored operation.

Preferably, the connected device is a television receiver.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Referring now to the accompanying drawings, a preferred embodiment of the present invention is described. The present invention relates to a linked operation program for linking operations between multiple devices connected to each other via a network, and to a connected device that serves to link operations between the multiple connected devices. In the embodiment described below, a linked operation program according to the present invention is installed in a digital television receiver (hereinafter, referred to simply as "DTV"). It is to be noted that the following description of preferred embodiment of the present invention has been presented for purposes of illustration and description, and is not intended to be exhaustive or to limit the present invention to the precise form disclosed.

Figure 1:
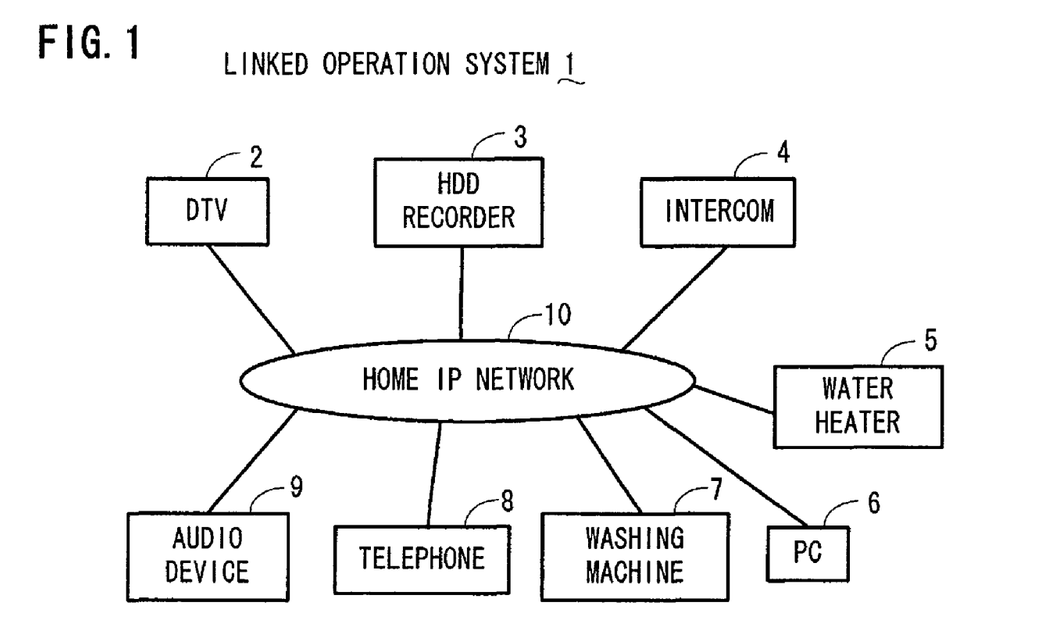
FIG. 1 shows the configuration of a linked operation system including a DTV in which a linked operation program embodying the present invention is installed.

FIG. 1 shows a linked operation system 1 that includes the DTV (claimed linked device or television receiver) in which the linked operation program according to this embodiment is installed. This linked operation system 1 comprises multiple devices (the DTV 2, an HDD recorder 3, an intercom 4, a water heater 5, a personal computer (PC) 6, a washing machine 7, a telephone 8, and an audio device 9) connected to each other via a home Internet Protocol (IP) network 10. The connected devices are in conformity with the Universal Plug and Play (UPnP) standard, which is a standard for connection of home PCs, home electric appliances, and the like. The DTV 2 is one of control points that are devices serving to control external devices in conformity with the UPnP standard.

Figure 2:
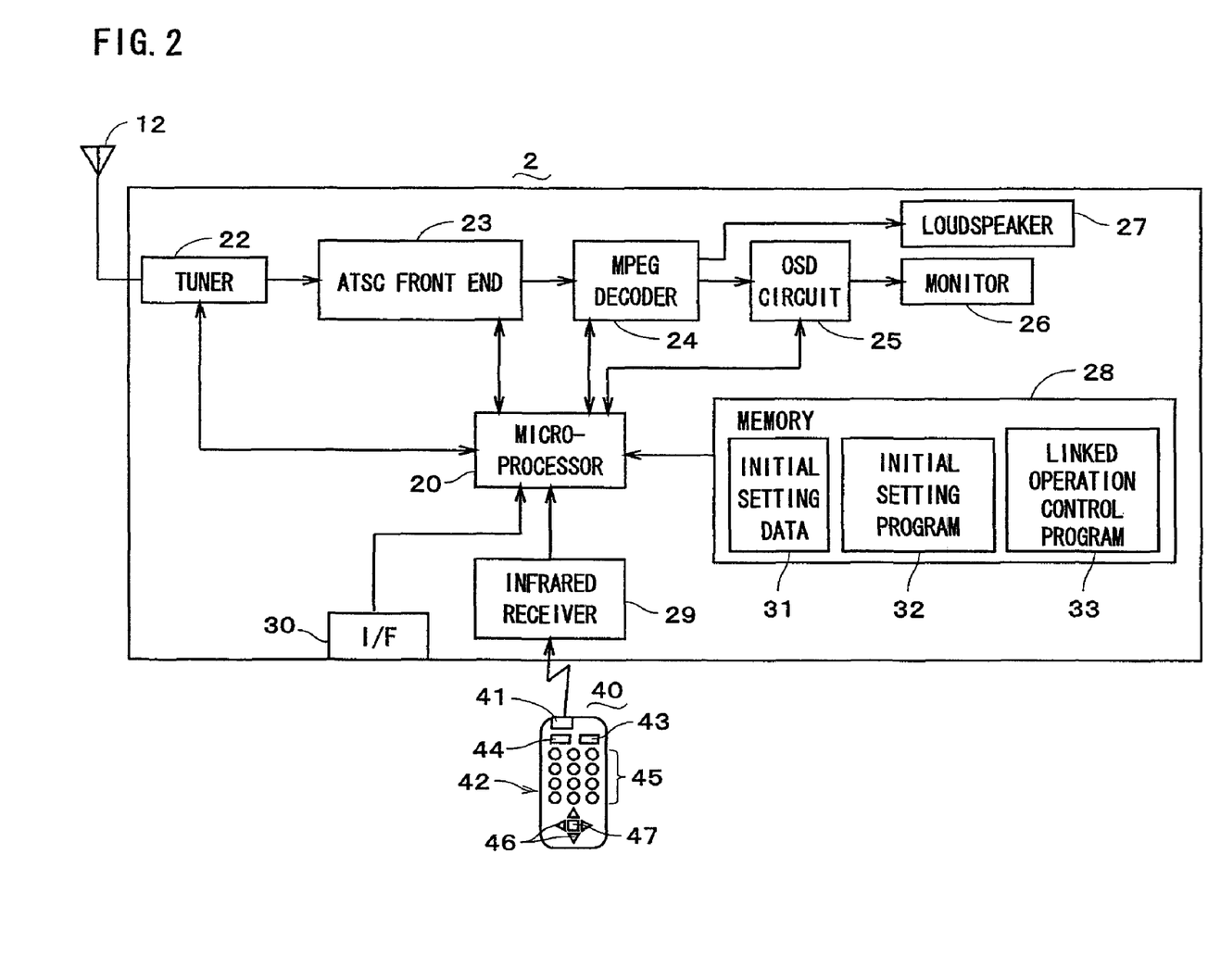
FIG. 2 is an electrical block diagram of the DTV.

FIG. 2 is an electrical block diagram of the DTV 2. The DTV 2 has a microprocessor 20 for controlling each component therein. The microprocessor 20 is connected via an internal bus to a tuner 22, an ATSC front end 23, an MPEG decoder 24, an on-screen display (OSD) circuit 25, a monitor 26, a loudspeaker 27, a memory 28 (linked operation setting storage means), an infrared receiver 29, and an interface (I/F) 30.

The tuner 22 is a tuner for digital television broadcasts (Advanced Television System Committee (ATSC) broadcasts), which extracts a broadcast signal on a user-selected channel from ATSC broadcast signals received by an antenna 12. The ATSC front end 23 demodulates broadcast signals extracted by the tuner 22 into transport stream (TS) packets in which video and audio signals for multiple television programs, an electronic program guide signal, and so on are time-division multiplexed. The ATSC front end 23 then extracts video and audio signals for a television program on a user-selected channel from the TS packets for output to the MPEG decoder 24 as well as extracting the electronic program guide signal for output to the microprocessor 20. The MPEG decoder 24 decodes MPEG-compressed (digitally compressed in accordance with the MPEG standard) video and audio signals received from the ATSC front end 23 into original video and audio signals before the MPEG compression. The OSD circuit 25 is a circuit for superimposing a signal corresponding to on-screen display data such as a channel number, an EPG screen, or the like on a video signal output from the MPEG decoder 24. The monitor 26 displays an image based on a video signal with or without an on-screen display data signal superimposed thereon that is output from the OSD circuit 25. The loudspeaker 27 outputs an audio based on an audio signal output from the MPEG decoder 24.

The memory 28 stores initial setting data 31, an initial setting program 32 that is a program for input of the initial setting data 31, and a linked operation control program 33 that is a program for control of an operation linked with an external device based on the initial setting data 31. The initial setting program 32 and the linked operation control program 33 correspond to claimed linked operation program. The initial setting program 32 and the microprocessor 20 correspond to claimed linked operation setting means. The initial setting program 32, the microprocessor 20, and the I/F 30 correspond to claimed registration request sending means. Further, the linked operation control program 33 and the microprocessor 20 correspond to claimed determining means and executing means.

The I/F 30 is an interface circuit for sending and receiving data to and from the other connected devices (connected devices other than the DTV 2) over the home IP network 10. The infrared receiver 29 receives an infrared command signal transmitted from a remote control 40, and converts the command signal into a standard digital signal for output to the microprocessor 20.

The remote control 40 has an infrared transmitter 41 and a key portion 42, where arranged are various keys such as a power key 43, numeric keys 45, cursor keys 46, an enter key 47, and a menu key 44 for causing various menus to be displayed. These keys on the remote control 40 are used for example to make settings on various menu screens.

Figure 3:
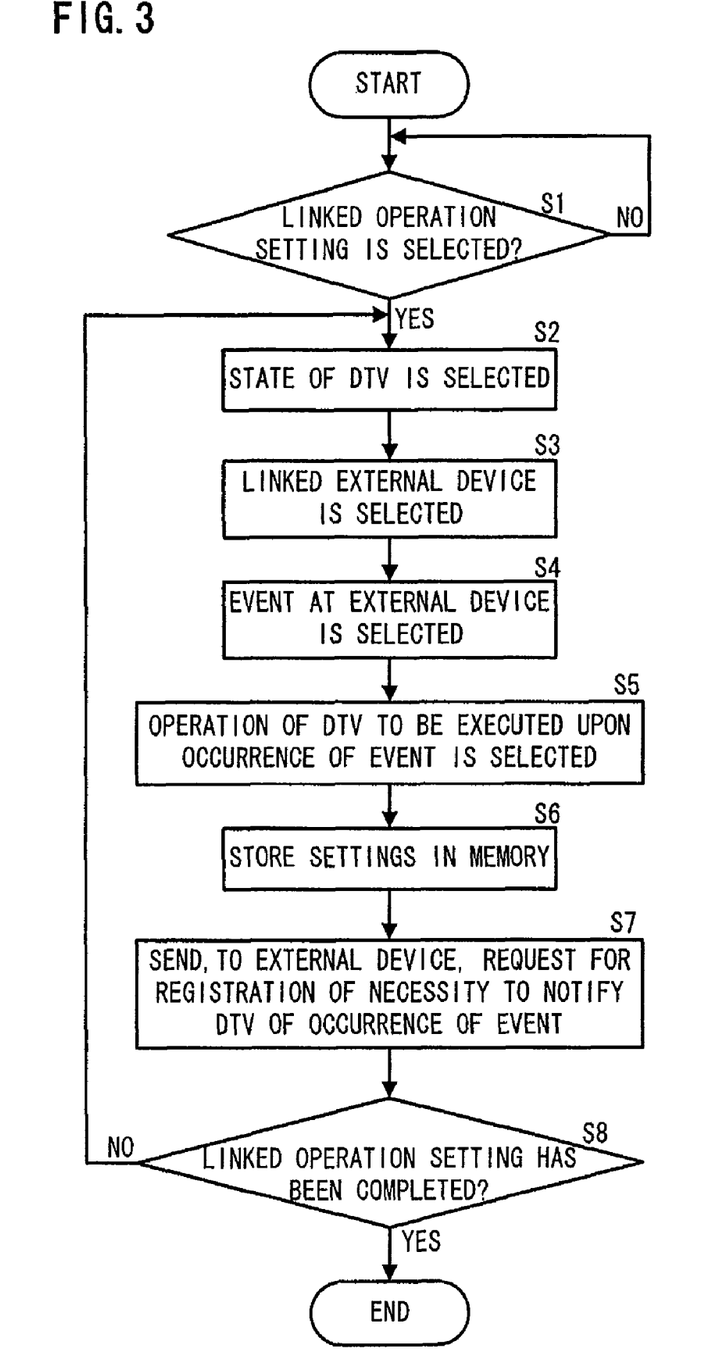
FIG. 3 is a flowchart showing a process to be executed by the DTV for setting an operation linked with an external device.
Figure 4:
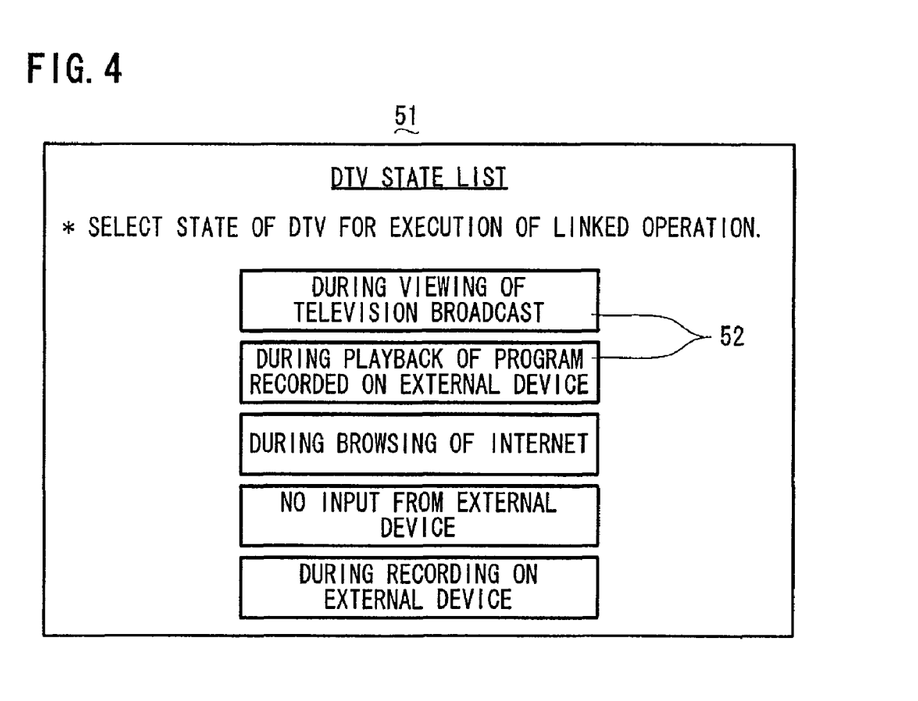
FIG. 4 shows a state list screen to be used in the setting process.
Figure 5:
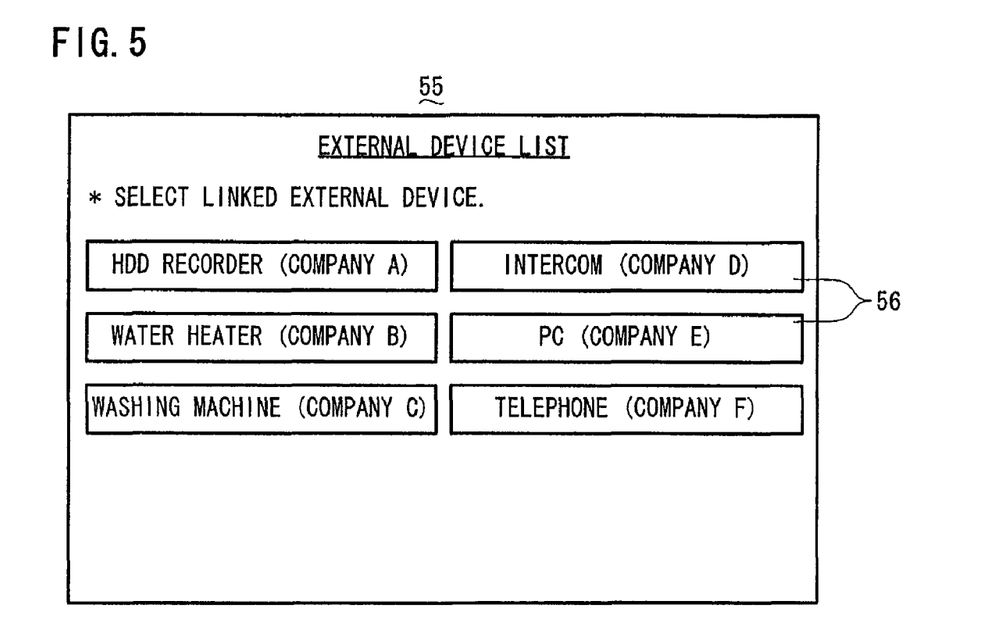
FIG. 5 shows an external device list screen to be used in the setting process.

Referring now to FIG. 3, it is described a process for setting an operation linked with an external device (process described in the initial setting program 32). The process starts when a user selects the setting of an operation linked with an external device with the use of the remote control 40 (S1). In response to the selection, the microprocessor 20 of the DTV 2 displays a state list screen 51, which is one of linked operation setting menus, on the monitor 26 as shown in FIG. 4. In this state, the user can select (set) a state of the DTV itself for execution of the linked operation by selecting a state button 52 displayed on the state list screen 51 with the use of the remote control 40 (S2). Then, the microprocessor 20 of the DTV 2 displays an external device list screen 55 on the monitor 26 as shown in FIG. 5 so as to prompt the user to select a linked external device. The external device list screen 55 shows, in the default state, device buttons 56 indicating the types and manufacturer names of the other connected devices (connected devices other than the DTV 2) on the home IP network 10, but it can alternatively show user-desired device names within the device buttons 56.

Figure 6:
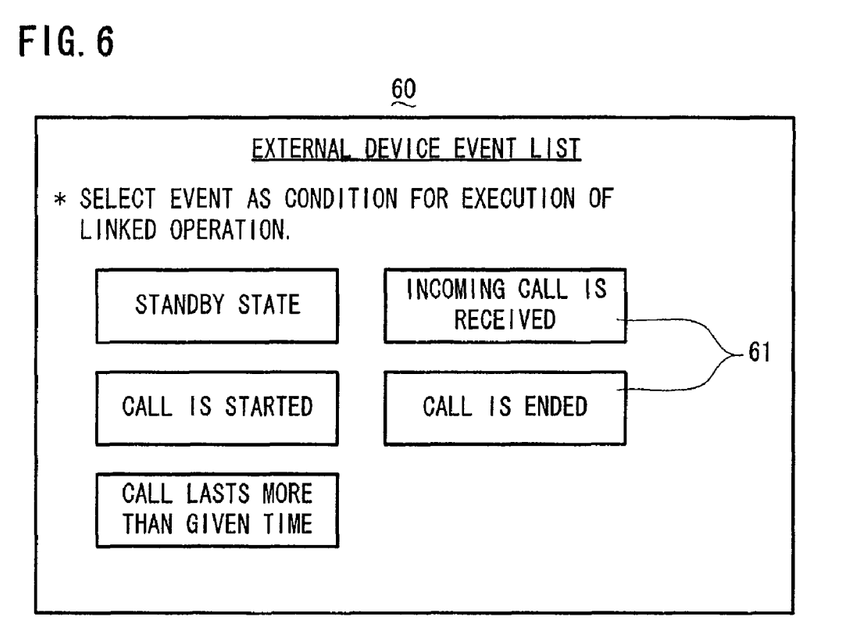
FIG. 6 shows an external device event list screen for a telephone that is used in the setting process.
Figure 7:
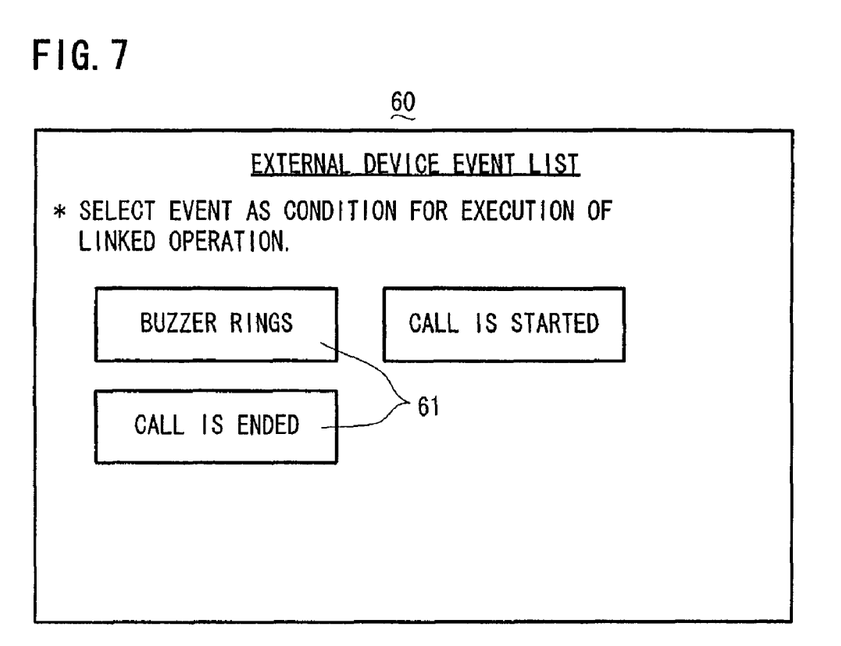
FIG. 7 shows an external device event list screen for an intercom that is used in the setting process.

When the user selects (sets) a linked external device by selecting a desired button 56 of the device buttons 56 displayed on the above described external device list screen 55 with the use of the remote control 40 (S3), the microprocessor 20 of the DTV 2 displays an event list screen (external device event list screen) 60 for the linked external device, which can be monitored by the external device, on the monitor 26 as shown in FIG. 6 and FIG. 7. Thereby, the microprocessor 20 prompts the user to select an event as a condition necessary for execution of the linked operations. FIG. 6 shows an external device event list screen 60 for the case where the linked external device is the telephone 8. FIG. 7 shows an external device event list screen 60 for the case where the linked external device is the intercom 4. For example, in the case where the linked external device is the telephone 8, an event occurs when the telephone 8 changes to a state such as "STANDBY STATE" (not during a call), "INCOMING CALL IS RECEIVED", "CALL IS STARTED", or "CALL IS ENDED" as shown in FIG. 6 (i.e., when the state of the external device changes).

Figure 8:
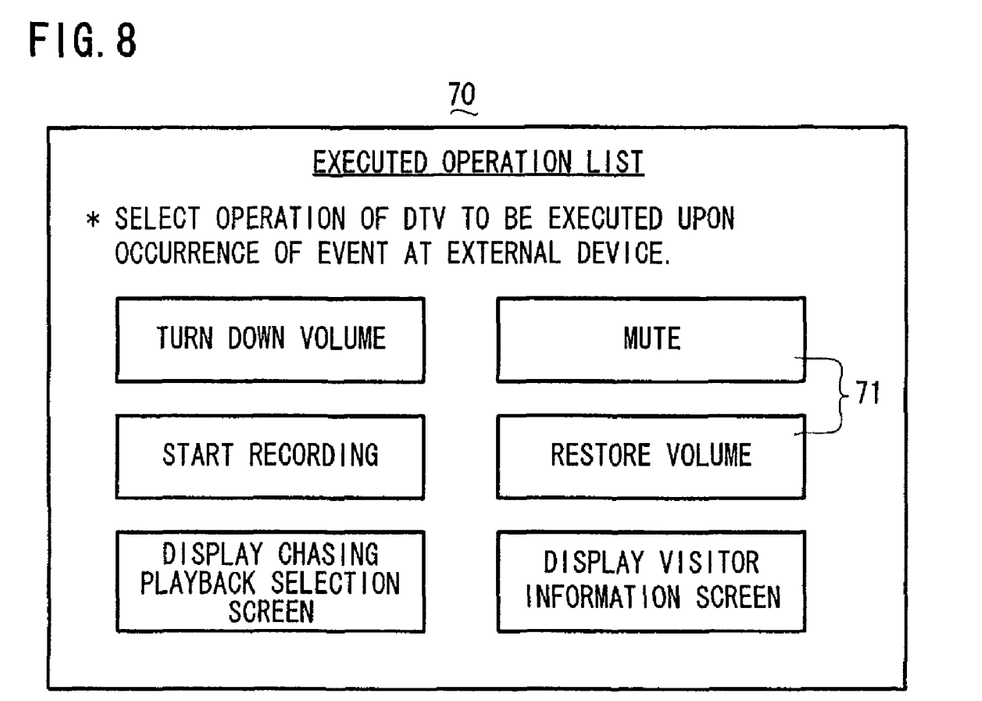
FIG. 8 shows an executed operation list screen to be used in the setting process.

Subsequently, the user can select (set) an event as a condition for execution of the linked operations by selecting a desired button 61 of the event buttons 61 displayed on the external device event list screen 60 with the use of the remote control 40 (S4). Then, the microprocessor 20 of the DTV 2 displays an executed operation list screen 70 on the monitor 26 as shown in FIG. 8 so as to prompt the user to select an operation of the DTV itself to be executed upon the occurrence of the event selected at the step S4.

When the user selects an operation of the DTV itself to be executed when the event occurs at the external device by selecting a desired button 71 of operation buttons 71 displayed on the executed operation list screen 70 with the use of the remote control 40 (S5), the microprocessor 20 of the DTV 2 stores (registers) the settings selected at the steps S2 to S5 as the initial setting data 31 in the memory 28 (S6). It is to be noted that, although an operation of the DTV itself is set as the operation to be executed upon the occurrence of an event at an external device in the above described example, an operation of a device other than the DTV can be also set as the operation to be executed upon the occurrence of an event at an external device. After completing the process of storing the initial setting data at the step S6, the microprocessor 20 of the DTV 2 sends, to the linked external device selected at the step S3, a request for registration of necessity to notify the DTV 2 itself of the occurrence of the event when the event occurs at the external device (i.e., when the state of the external device changes), in the form of SUBSCRIBE in accordance with the UPnP standard (S7). The process of setting an operation linked with an external device that is shown as the steps S2 to S7 is repeated until all operations linked with external devices are completely set (YES at S8).

Figure 9:
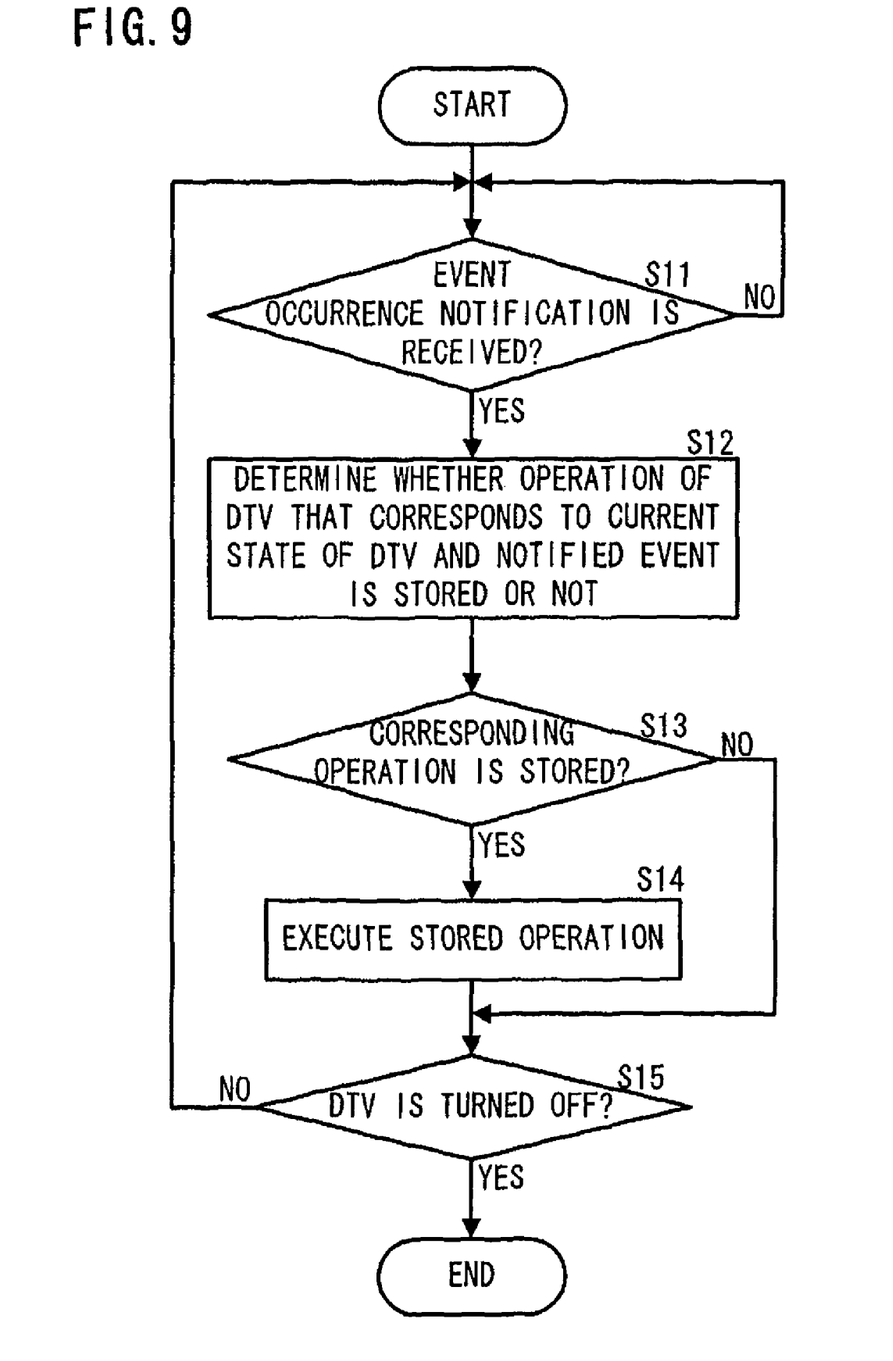
FIG. 9 is a flowchart showing how the DTV executes a linked operation process for the DTV itself when receiving a notification of occurrence of an event.

Referring now to FIG. 9, it is described what process is executed by the DTV 2 itself when a notification of occurrence of an event is received from a linked external device selected at the selection step S3 (this process is described in the linked operation control program 33). When the microprocessor 20 of the DTV 2 receives a notification of occurrence of an event from a linked external device (YES at S11), it determines whether or not an operation of the DTV 2 itself that corresponds to the current state of the DTV 2 itself, the external device from which the notification has been sent, and the notified event is stored (registered) as the initial setting data 31 in the memory 28 (S12). If it is found as a result of the determination that an operation of the DTV 2 corresponding to the conditions is stored (registered) in the memory 28 (YES at S13), the microprocessor 20 of the DTV 2 executes the operation stored (registered) in the memory 28 (S14). The microprocessor 20 of the DTV 2 repeats the process of the steps S11 to S14 until the DTV 2 itself is turned off (YES at S15).

Now, advantages achieved by executing the process shown in FIG. 3 to FIG. 9 are described by giving an example. In this example, assume that a user receives a call while viewing a television broadcast on the DTV 2. When receiving a call while viewing a television broadcast on the DTV 2, a user should have a problem described below and should perform actions described below.

First, the user should have the following problem. When the volume of sound output from the loudspeaker 27 of the DTV 2 is high, the user cannot hear the telephone 8 ringing (this is hereinafter referred to as "first problem"). Actions to be performed by the user are as follows. First, when the volume of sound output from the loudspeaker 27 of the DTV 2 is high, it is hard for the user to hear the caller. Therefore, the user should turn down the DTV 2 before taking the incoming call (hereinafter, referred to as "first action"). Second, if the call at the telephone 8 lasts long and a current television program being broadcast is a desired one, the user may desire to record the program (hereinafter, referred to as "second action"). Third, when the call at the telephone 8 ends, the user should turn up the DTV 2 again (hereinafter, referred to as "third action").

The above described first problem can be solved by the microprocessor 20 of the DTV 2 turning down the volume to a predetermined level when the telephone 8 rings. To enable this linked operation, the user needs to make the following selections in the linked operation setting process shown in FIG. 3. First, the user selects a state button 52 indicating the state that requires turning down the volume on the DTV 2 when the telephone 8 rings from among the state buttons 52 displayed on the DTV state list screen 51 shown in FIG. 4. More particularly, the user selects, for example, state buttons 52 marked "DURING VIEWING OF TELEVISION BROADCAST", "DURING PLAYBACK OF PROGRAM RECORDED ON EXTERNAL DEVICE", and "DURING RECORDING ON EXTERNAL DEVICE". Next, the user selects a button 56 corresponding to the telephone 8 from among the device buttons 56 displayed on the external device list screen 55 shown in FIG. 5. Further, the user selects an event button 61 marked "INCOMING CALL IS RECEIVED" from among the event buttons 61 displayed on the external device event list screen 60 shown in FIG. 6, and selects an operation button 71 marked "TURN DOWN VOLUME" from among the operation buttons 71 displayed on the executed operation list screen 70 shown in FIG. 8.

The above described first action can be automatically performed by the microprocessor 20 of the DTV 2 executing a linked operation to further turn down the volume when the user answers the telephone 8. For enabling this linked operation, the user needs to make the following selections in the linked operation setting process shown in FIG. 3. First, the user selects a state button 52 indicating the state that requires further turning down the volume on the DTV 2 when a user answers the telephone 8 from among the state buttons 52 displayed on the DTV state list screen 51 shown in FIG. 4. More particularly, the user selects, for example, state buttons 52 marked "DURING VIEWING OF TELEVISION BROADCAST", "DURING PLAYBACK OF PROGRAM RECORDED ON EXTERNAL DEVICE", and "DURING RECORDING ON EXTERNAL DEVICE". Next, the user selects the button 56 corresponding to the telephone 8 from among the device buttons 56 displayed on the external device list screen 55 shown in FIG. 5. Further, the user selects an event button 61 marked "CALL IS STARTED" from among the event buttons 61 displayed on the external device event list screen 60 shown in FIG. 6, and selects an operation button 71 marked "MUTE" from among the operation buttons 71 displayed on the executed operation list screen 70 shown in FIG. 8.

The above described second action can be automatically performed by the microprocessor 20 of the DTV 2 executing a linked operation to start recording on the HDD recorder 3 when a call lasts more than a given time. For enabling this linked operation, the user needs to make the following selections in the linked operation setting process shown in FIG. 3. First, the user selects a state button 52 indicating the state that requires the start of recording when the given time has elapsed from the start of a call from among the state buttons 52 displayed on the DTV state list screen 51 shown in FIG. 4. More particularly, the user selects the state button 52 marked "DURING VIEWING OF TELEVISION BROADCAST". Next, the user selects the button 56 corresponding to the telephone 8 from among the device buttons 56 displayed on the external device list screen 55 shown in FIG. 5. Further, the user selects an event button 61 marked "CALL LASTS MORE THAN GIVEN TIME" from among the event buttons 61 displayed on the external device event list screen 60 shown in FIG. 6, and selects an operation button 71 marked "START RECORDING" from among the operation buttons 71 displayed on the executed operation list screen 70 shown in FIG. 8.

Figure 10:
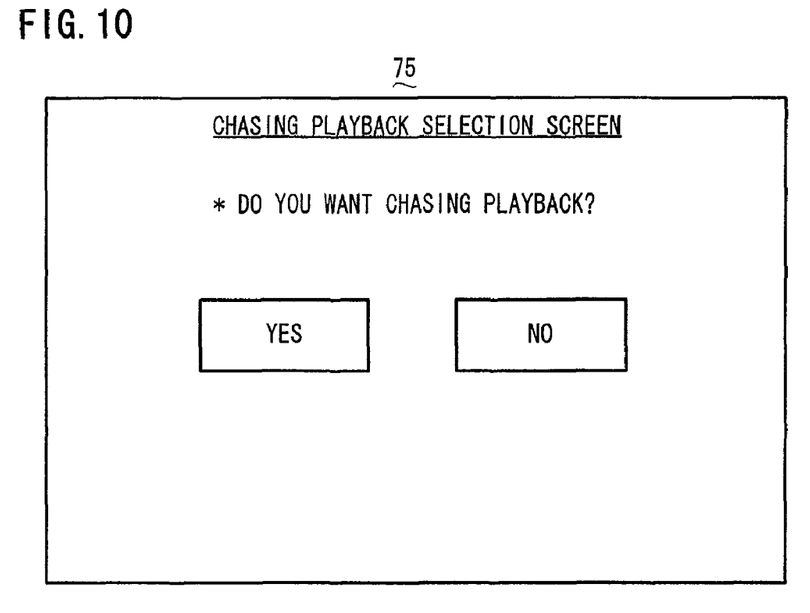
FIG. 10 shows a chasing playback selection screen to be used in the linked operation process.

In the case where the above described second action has been automatically performed and thus recording on the HDD recorder 3 has been already started at the end of the call at the telephone 8, the microprocessor 20 of the DTV 2 needs to prompt the user to start chasing playback. For this linked operation, the user needs to make the following selections in the linked operation setting process shown in FIG. 3. First, the user selects a state button 52 indicating the state that requires chasing playback from among the state buttons 52 displayed on the DTV state list screen 51 shown in FIG. 4. More particularly, the user selects the state button 52 marked "DURING RECORDING ON EXTERNAL DEVICE". Next, the user selects the button 56 corresponding to the telephone 8 from among the device buttons 56 displayed on the external device list screen 55 shown in FIG. 5. Further, the user selects an event button 61 marked "CALL IS ENDED" from among the event buttons 61 displayed on the external device event list screen 60 shown in FIG. 6, and selects an operation button 71 marked "DISPLAY CHASING PLAYBACK SELECTION SCREEN" from among the operation buttons 71 displayed on the executed operation list screen 70 shown in FIG. 8. In accordance with the user selections described above, the microprocessor 20 of the DTV 2 displays a chasing playback selection screen 75 as shown in FIG. 10 on the monitor 26 to prompt the user to start chasing playback when a call at the telephone 8 ends.

The above described third action can be automatically performed by executing a linked operation to turn up the DTV 2 again after the end of a call at the telephone 8. To enable this linked operation, the user needs to make the following selections in the linked operation setting process shown in FIG. 3. First, the user selects a state button 52 indicating the state that requires restoring of the volume of the DTV 2 when a call at the telephone 8 ends from among the state buttons 52 displayed on the DTV state list screen 51 shown in FIG. 4. More particularly, the user selects, for example, the state buttons 52 marked "DURING VIEWING OF TELEVISION BROADCAST", "DURING PLAYBACK OF PROGRAM RECORDED ON EXTERNAL DEVICE", and "DURING RECORDING ON EXTERNAL DEVICE". Next, the user selects the button 56 corresponding to the telephone 8 from among the device buttons 56 displayed on the external device list screen 55 shown in FIG. 5. Further, the user selects the event button 61 marked "CALL IS ENDED" from among the event buttons 61 displayed on the external device event list screen 60 shown in FIG. 6, and selects an operation button 71 marked "RESTORE VOLUME" from among the operation buttons 71 displayed on the executed operation list screen 70 shown in FIG. 8.

Another example is given for describing advantages achieved by executing,the process shown in FIG. 3 to FIG. 9. In this example, assume that, when a user is viewing on the DTV 2 a program recorded on the HDD recorder 3, a visitor rings the buzzer on the intercom 4 (see FIG. 1). When a visitor rings the buzzer on the intercom 4 while a user is viewing on the DTV 2 a program recorded on the HDD recorder 3, the user should have a problem described below and should perform actions described below.

First, the user should have the following problem. When the volume of sound output from the loudspeaker 27 of the DTV 2 is high, the user cannot notice the visitor (i.e., cannot hear the buzzer on the intercom 4) (this problem is hereinafter referred to as "second problem"). Actions to be performed by the user are as follows. First, when the visitor comes (i.e., when the buzzer on the intercom 4 rings), the user should pause the playback of the program being viewed (this action is hereinafter referred to as "fourth action"). Second, after the visitor leaves, the user should resume the playback of the program being viewed (this action is hereinafter referred to as "fifth action").

The above described second problem can be solved by the microprocessor 20 of the DTV 2 displaying information indicating the visitor on the monitor 26 when the buzzer on the intercom 4 rings. To enable this linked operation, the user needs to make the following selections in the linked operation setting process shown in FIG. 3. First, the user selects the state button 52 marked "DURING PLAYBACK OF PROGRAM RECORDED ON EXTERNAL DEVICE" from among the state buttons 52 displayed on the DTV state list screen 51 shown in FIG. 4. Next, the user selects a button 56 corresponding to the intercom 4 from among the device buttons 56 displayed on the external device list screen 55 shown in FIG. 5. Further, the user selects an event button 61 marked "BUZZER RINGS" from among event buttons 61 displayed on the external device event list screen 60 shown in FIG. 7, and selects an operation button 71 marked "DISPLAY VISITOR INFORMATION SCREEN" from among the operation buttons 71 displayed on the executed operation list screen 70 shown in FIG. 8.

Figure 11:
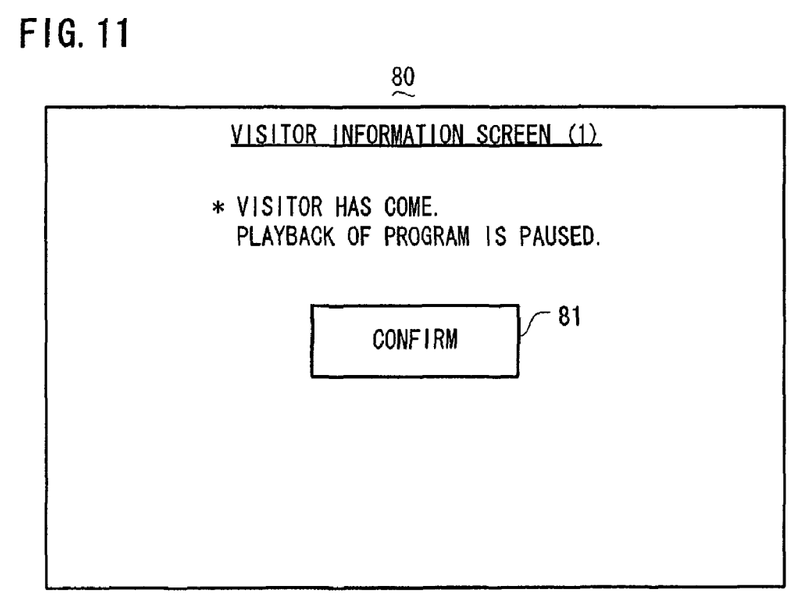
FIG. 11 shows a visitor information screen (1) to be used in the linked operation process.

In accordance with the above described selections by the user, the microprocessor 20 of the DTV 2 displays a visitor information screen (1) 80 shown in FIG. 11 on the monitor 26 to inform the user of the visitor when the buzzer on the intercom 4 rings.

The above described fourth action can be performed by the microprocessor 20 of the DTV 2 in the following manner. When the user selects a confirm button 81 on the visitor information screen (1) 80 displayed on the monitor 26 with the use of the remote control 40, the microprocessor 20 of the DTV 2 pauses the program being played. Further, when the user selects the confirm button 81 on the visitor information screen (1) 80 by the remote control 40, the microprocessor 20 of the DTV 2 displays a visitor information screen (2) 83 shown in FIG. 12 on the monitor 26 as well as pausing the program being played.

Figure 12:
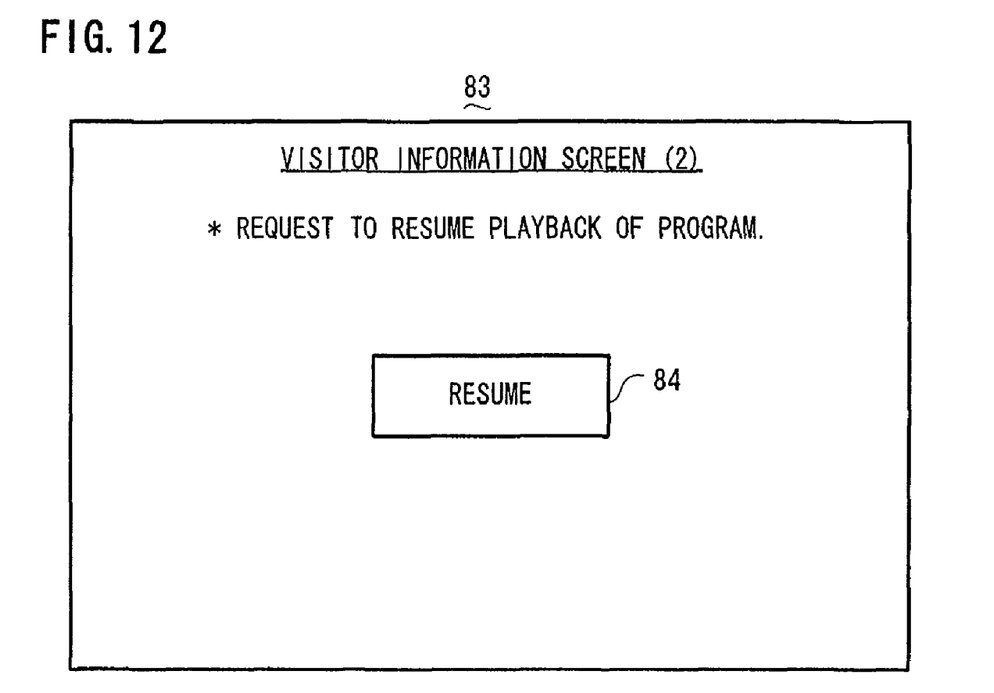
FIG. 12 shows a visitor information screen (2) to be used in the linked operation process.

The above described fifth action can be performed by the microprocessor 20 of the DTV 2 in the following manner. When the user selects a resume button 84 on the visitor information screen (2) 83 displayed on the monitor 26 with the use of the remote control 40, the microprocessor 20 of the DTV 2 resumes the playback of the program.

As described above, when receiving a notification of occurrence of an event from a linked external device, the DTV 2 in this embodiment can execute its operation appropriate to the current state of the DTV 2 itself, the external device from which the notification has been sent, and the notified event. In this manner, upon the occurrence of an event at an external device, the DTV 2 can execute its operation after taking into account the current state of the DTV 2 itself. Accordingly, the DTV 2 can increase the probability that linked operations will be performed as a user truly desires.

The present invention has been described above using a presently preferred embodiment, but those skilled in the art will appreciate that various modifications are possible. For example, although the linked operation program according to the present invention is installed in the DTV in the above described embodiment, it can be installed in other connected device such as a personal computer or a HDD recorder. It is desirable that a connected device in which a linked operation program according to the present invention is installed has a monitor capable of displaying various selection screens as shown in FIG. 4 to FIG. 8. Further, a connected device in which a linked operation program according to the present invention is installed as well as devices linked to the connected device does not necessarily need to be in conformity with the UPnP standard.

This application is based on Japanese patent application 2005-298729 filed Oct. 13, 2005, the contents of which are hereby incorporated by reference.

What is claimed is:

1. A program product stored on a recordable medium for linking operations between multiple connected devices connected to each other via a network, wherein the program product is installed in a connected device of the multiple connected devices, and the connected device is a linked device, wherein the program product comprises:

program code for setting a state of the linked device for execution of linked operations between the connected devices, a state change representing an occurrence of an event at an external device in the network that is a condition for execution of the linked operations, and an operation of the linked device to be executed upon the occurrence of the event at the external device;

program code for storing settings set by the program code for setting;

program code for sending, to the external device, a request for registration of necessity to notify the linked device of occurrence of an event when the event occurs at the external device;

program code for, upon receipt of a notification of occurrence of an event from the external device, determining whether an operation of the linked device that corresponds to a current state of the linked device and to the notified event is stored or not; and program code for, when it is found as a result of the determination that the corresponding operation of the linked device is stored, executing the stored operation;

wherein the program code for setting is program code for further setting the external device at which the event occurs, wherein the multiple connected devices include a telephone, a television receiver, and an HDD recorder, wherein the external device at which the event occurs is the telephone and the event is a call at the telephone, wherein the linked device is the television receiver, wherein when the call at the telephone lasts more than a given time, the television receiver makes the HDD recorder start recording, and wherein when the recording on the HDD recorder has been already started at the end of the call at the telephone, the television receiver prompts the user to start chasing playback.

\* \* \* \* \*